(12) United States Patent
Wolfgang et al.

(10) Patent No.: US 7,225,371 B2
(45) Date of Patent: May 29, 2007

(54) METHOD AND APPARATUS FOR STORING AND RETRIEVING MULTIPLE POINT-IN-TIME CONSISTENT DATA SETS

(75) Inventors: John J. Wolfgang, Tucson, AZ (US); Kenneth F. Day, III, Tucson, AZ (US); Philip M. Doatmas, Tucson, AZ (US); Kenneth W. Boyd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 10/910,714

(22) Filed: Aug. 3, 2004

(65) Prior Publication Data

US 2006/0041823 A1 Feb. 23, 2006

(51) Int. Cl.
*G11C 29/00* (2006.01)
(52) U.S. Cl. .......................................... 714/710; 714/54
(58) Field of Classification Search ................ 714/6, 714/710, 747, 54; 711/130, 162; 707/204, 707/100
See application file for complete search history.

(56) References Cited

U.S. PATENT DOCUMENTS

| | | | | |
|---|---|---|---|---|
| 5,454,099 | A | * | 9/1995 | Myers et al. .................... 714/6 |
| 5,813,032 | A | * | 9/1998 | Bhargava et al. ........... 711/130 |
| 5,875,479 | A | * | 2/1999 | Blount et al. ................ 711/162 |
| 6,078,932 | A | * | 6/2000 | Haye et al. .................. 707/204 |
| 6,081,875 | A | | 6/2000 | Clifton et al. |
| 6,594,744 | B1 | * | 7/2003 | Humlicek et al. ........... 711/162 |
| 6,678,809 | B1 | * | 1/2004 | Delaney et al. .............. 711/162 |
| 6,799,258 | B1 | * | 9/2004 | Linde .......................... 711/162 |
| 6,957,221 | B1 | * | 10/2005 | Hart et al. ................... 707/100 |
| 2003/0005235 | A1 | | 1/2003 | Young |
| 2003/0167333 | A1 | | 9/2003 | Kumar et al. |

OTHER PUBLICATIONS

SUN Microsystems (1999) Point-in-Time Copy Technologies, http://sunsolve.sun.com/kmsattachments/26755.copy-tech.pdf.

* cited by examiner

*Primary Examiner*—David Ton
(74) *Attorney, Agent, or Firm*—Dan Shifrin

(57) ABSTRACT

A method, apparatus, and article of manufacture containing instructions for processing multiple point-in-time consistent data sets. The method consists of creating multiple point-in-time data sets associated with a backup appliance which is associated with backup storage. Upon the transfer of a first update from a primary storage controller to the backup appliance, a determination is made whether the update affects data stored in the backup storage has been unchanged following the creation of the respective data sets. If the update does affect data which is unchanged following the creation of a data set, the current, non-updated data is read from the backup storage. A copy of the current, non-updated data thus read from the backup storage is stored in a storage location which can be one of the data sets or an independent memory location. In addition, pointers are associated with the remaining applicable data sets and directed to the copy at its storage location. Subsequently, the update is applied to the data on the backup storage device. In the event an update is subsequently transferred from the primary storage controller to the backup appliance which affects data stored in backup storage which has already been changed since the creation of an applicable data set, no further data is written to the applicable data set and the update is applied to the backup storage.

30 Claims, 3 Drawing Sheets

METHOD AND APPARATUS FOR STORING AND RETRIEVING MULTIPLE POINT-IN-TIME CONSISTENT DATA SETS

TECHNICAL FIELD

The present invention is directed to creating multiple point-in-time consistent data sets and more particularly to a technique to save multiple persistent, independent data sets which facilitate reversion of a backup storage system to a state existing at a select prior point in time.

BACKGROUND ART

Computer storage disaster recovery systems typically address two types of failures: a sudden catastrophic failure at a single point in time, or data loss over a period of time. In the second type of gradual failure, updates to data volumes may be lost. To assist in recovery of data updates, a copy of data may be provided at a remote location. The assignee of the subject patent application, International Business Machines Corporation (IBM®), presently provides two systems for maintaining remote copies of data at secondary, tertiary or other backup storage device; extended remote copy (XRC) and peer to peer remote copy (PPRC). These systems provide a method for recovering data updates between a last, safe backup and a system failure. Such data shadowing systems can also provide an additional remote copy for nonrecovery purposes, such as local access at a remote site. In typical backup systems, data is maintained in volume pairs. A volume pair is comprised of a volume in a primary storage device and a corresponding volume in a secondary storage device that includes an identical copy of the data maintained in the primary volume. Typically, the primary and secondary storage volumes will be maintained in a direct access storage device (DASD). Primary and secondary storage controllers are typically provided to control access to the respective DASDs.

In shadowing or remote copy systems such as described above, a device or computer receives inbound transfers of data updates and subsequently transfers the updates outbound to another computer or device. For example, a primary storage controller may send transfers to a primary backup appliance which in turn offloads the transferred data updates to a secondary backup appliance associated with a secondary storage controller at a remote site. It is possible that the transfers are accomplished either synchronously with the initial write of data by the primary storage controller or asynchronously. In an asynchronous system, a backup appliance which is typically a secondary backup appliance receives transfers from the primary storage controller either directy or through intermediate appliances or devices and saves each transfer in a memory device to which it has access. The backup appliance then typically confirms acceptance of the transfer of data with the primary controller. Subsequently, the backup appliance is responsible for offloading this data to the secondary storage controller. A problem exists with asynchronous solutions which can expose the data processing system to possible error scenarios where the primary and secondary storage controllers are not consistent. For example, if data transfers are sent from the backup appliance to the secondary controller in an order that is different from the order they were received from the primary, and a failure occurs during the transfer of data, the secondary controller will not receive the data in the proper order and it is no longer guaranteed that the primary and secondary controllers will contain the same data.

Partial solutions to this problem exist which typically involve the formation of a consistent set of transactions between the primary and secondary controllers at the backup appliance. The backup appliance forms these data sets, or consistency groups, and then offloads them to the secondary controller in a regulated manner. When a data set is offloaded to the secondary, the secondary is then in a point-in-time consistent state with the primary controller. Only after completion of a given set of transfers does the backup appliance begin to offload a second set of transfers.

The formation and regulated transfer of consistent data sets or consistency groups alone is still not sufficient, however, to guarantee that the primary and secondary controllers are always consistent. It is possible that a failure will occur during the transfer of updates to the secondary controller which will result in an inconsistent state because some, but not all, of the transfers in the consistent set have been updated. This situation may be remedied through a technique known as "read-before-write". When read-before-write is implemented, the backup appliance will have received a set of transactions that need to be written to the secondary controller to bring the secondary into consistency with the primary controller. Before writing the new transactions, however, the backup appliance will read the data that is to be updated from the secondary storage and save a current version of it to a storage disk or other memory to which it has access. Only after the current data is stored at the backup appliance will the updated data be written to the secondary controller. Using this method, if a failure occurs while writing the set to the secondary controller, the backup appliance can rewrite the saved version of the data back to the secondary and effectively put the secondary back in its previous consistent state.

The read-before-write technique may allow some data to be lost, but the primary and secondary controllers will still be consistent at the prior point in time, thus it will not require a complete copy of the entire primary controller's data to put the secondary back into a full and current consistent state with the primary.

Typically, read-before-write data set may persist for only a very short period of time depending on the amount of storage allocated for them and the size of each set. Thus, a read-before-write data set will not allow the backup appliance to restore the secondary controller to a previous state that existed prior to the last remaining read-before-write transaction. Also, independent access to previous data storage states for nonrecovery purposes is typically unavailable as the backup appliance must apply the previous states sequentially to restore the secondary controller to the desired state. Thus, the backup appliance can only, when implementing read-before-write techniques, move backward and forward within a group of consistent sets, allowing restoration of the secondary controller to a selected saved state and then updating to any previous or future saved states that exist within the limited set of standard saved states. It is desirable to maintain multiple point-in-time consistent data sets that persist for a longer period of time than the standard read-before-write sets, and that are not subject to the requirement of having to apply each previous read-before-write set in order to successfully apply the desired set. Thus, there is a need in the art for an improved method and apparatus for storing and retrieving multiple point-in-time consistent data sets.

SUMMARY OF THE INVENTION

The need in the art is met by a method, apparatus, and article of manufacture containing instructions for processing multiple point-in-time consistent data sets. The method consists of creating multiple point-in-time data sets associated with a backup appliance which is associated with backup storage. Upon the transfer of a first update from a primary storage controller to the backup appliance, a determination is made whether the update affects data stored in the backup storage has been unchanged following the creation of the respective data sets. If the update does affect data which is unchanged following the creation of a data set, the current, non-updated data is read from the backup storage. A copy of the current, non-updated data thus read from the backup storage is stored in a storage location which can be one of the data sets or an independent memory location. In addition, pointers are associated with the remaining applicable data sets and directed to the copy of the data at its storage location. Subsequently, the update is applied to the data on the backup storage device. In the event an update is subsequently transferred from the primary storage controller to the backup appliance which affects data stored in backup storage which has already been changed since the creation of an applicable data set, no further data is written to the applicable data set and the update is applied to the backup storage.

The method of the present invention may further consist of reverting the backup storage to a state that existed at the time a select data set was created.

Preferably, the current version of data which is the subject of an update will be stored in a data set having relatively longer persistence.

DETAILED DESCRIPTION OF THE PREFERRED EMBODIMENT

Figure 1:
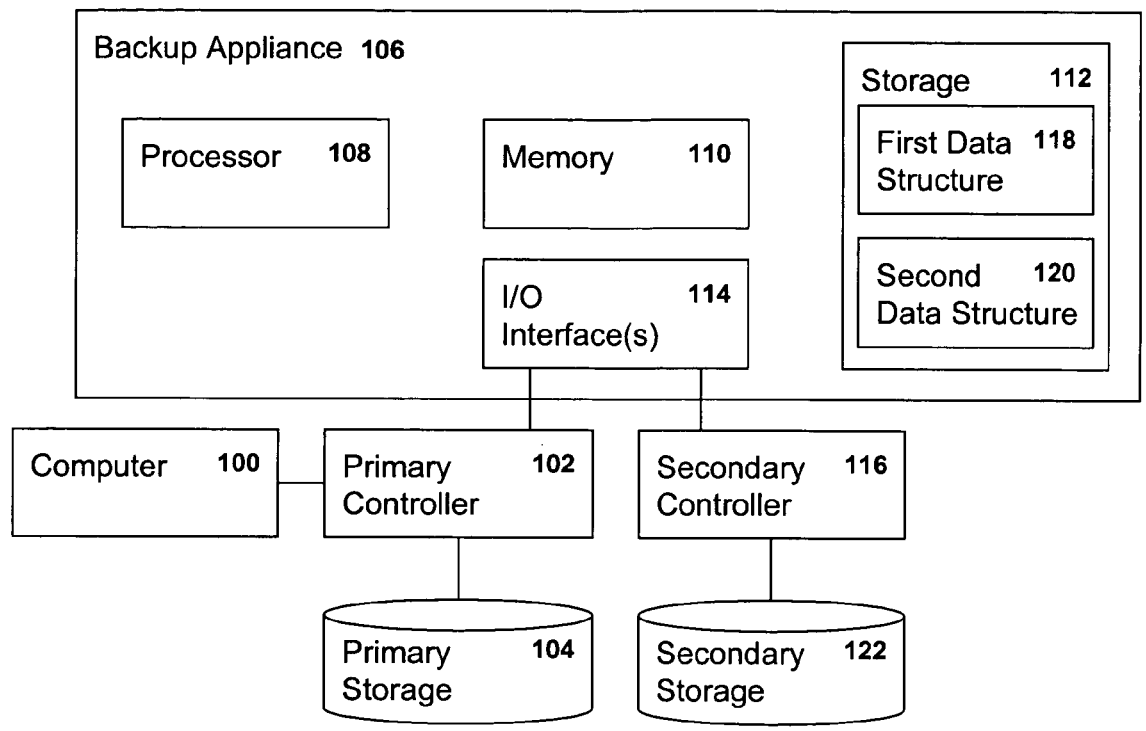
FIG. 1 is a block diagram illustrating a data processing environment in which a preferred embodiment may be implemented.

FIG. 1 illustrates in a block diagram one possible computing environment in accordance with an implementation of the invention. A computing device which generates data for storage, which is shown on FIG. 1 as a computer 100 but which may be any type of data generating device, communicates for storage purposes with a primary controller 102. The primary controller 102 accepts transfers of data from the computer 100 and writes the data to primary storage 104. In addition, the primary controller 102 transfers the data received from the computer 100 to one or more backup appliances. Preferably, a symmetrical configuration of backup appliances is utilized with the primary controller 102 in communication with a primary backup appliance, which in turn communicates over an extended distance with a secondary backup appliance. The secondary backup appliance is then in communication with the secondary controller. The methods disclosed herein will typically, but not necessarily be carried out on the secondary backup appliance. Therefore FIG. 1 shows only a single backup appliance 106. As used and defined herein, the transfer of a data update from a controller which can be the primary controller 102 to the backup appliance 106 shall include direct transfers or communications, and transfers or communications through an intermediate device which could for example be a primary backup appliance.

The backup appliance 106 is critical for coordinating redundant backup storage operations to assure that any loss of data is minimized in the event of a failure associated with the primary storage 104. Typically, a backup appliance 106 will be associated with a processor 108, memory 110, and dedicated storage 112. In addition, the backup appliance 106 will have multiple input/output (I/O) interface(s) 114 for communication with the primary controller 102, a secondary controller 116, or other controllers or appliances not shown on FIG. 1. The storage 112 associated with the backup appliance 106 may be associated with multiple data structures, the use of which to implement the invention is described herein. Although the storage 112 may be associated with any number of data structures, on FIG. 1 a simplified representation consisting of a first data structure 118 and a second data structure 120 is shown.

In a typical asynchronous system, the backup appliance 106 receives transfers of data from the primary controller 102 and saves each transfer in memory 110. The backup appliance 106 then notifies the primary controller 102 that it has accepted the data. As discussed in detail below, the backup appliance 106 subsequently offloads the data to the secondary controller 116 for redundant storage in secondary, tertiary or other backup storage. As defined and used herein, backup storage shall encompass secondary storage 122, or any other storage used in whole or in part to store a copy of data previously or concurrently stored elsewhere.

As discussed in some detail above, it is possible to configure the backup appliance 106 to create read-before-write data sets as a means of partially eliminating the risk of data loss in the event a failure occurs associated with the secondary controller 116 during the transfer of a data update from the backup appliance 106. The backup appliance 106 forms read-before-write sets and then offloads them to the secondary controller 116 in a controlled manner. When a read-before-write set is offloaded to the secondary controller 116, the secondary is then in a point-in-time consistent state with the primary controller 102. The point-in-time of consistency is current through the point in time at which the read-before-write set was created. Typical read-before-write sets are dependent data sets. Dependent data sets must be applied from the backup appliance 106 to the secondary controller 116 sequentially to ensure consistency between the primary controller 102 and the secondary controller 116. In addition, typical read-before-write sets persist only for a limited period of time depending on the amount of storage allocated to them and the amount of data in each set. The method, article of manufacture, and apparatus disclosed herein provide for the backup appliance 106 to restore the secondary controller 116 and secondary storage 122 to any previous state for which data is still saved in the backup appliance storage 112. The techniques of this invention enable the backup appliance 106 to move backward and forward within a group of consistent data sets, thus restoring the secondary controller 116 and storage 122 to any saved state and then updating to any previous or future saved state.

The present invention allows a storage system user to designate, create or select multiple point-in-time consistent data sets. The data sets contemplated by the present invention are not necessarily dependent data sets. Typically, a data set of the present invention will be formed at a specific point in time, for example, the beginning of a business day or the beginning of each hour during the business day. The data sets of the present invention will allow reversion of the state of storage to the state at the time a data set was created; however, as discussed in detail below, it is not necessary under the present invention to store a complete copy of data in a particular point-in-time consistent data set.

As described below with respect to FIGS. 2–4, a data structure such as a binary tree is useful for implementing Applicant's invention. However, Applicant's invention is not limited to or restricted by the representative data structures described in FIGS. 2–4. On the contrary, Applicant's invention can be implemented with any type of suitable data structure and data searching strategy.

The formation and processing of multiple point-in-time consistent data sets begins with the creation of a new persistent data set. For example, the user of a storage system may designate that a point-in-time consistent data set shall be commenced at the beginning of a business day. As shown in FIG. 2, the user may access a user interface to instruct the backup appliance 106 to create a new set (step 200). Upon receipt of the command to create a new set, the processor 108 associated with the backup appliance 106 will execute commands which will allocate a new tree header (step 202) in a data structure maintained for the processing of multiple point-in-time consistent data sets. In addition, the processor 108 will add a new tree to the active tree list (step 204) in the data structure. Preferably, each designated point-in-time consistent data set of the multiple point-in-time consistent data sets formed will be associated with a data structure associated with the storage 112. For illustration purposes on FIG. 1, two data structures associated with two point-in-time consistent data sets are shown: a first data structure 118 and a second data structure 120. Applicant's invention is not limited to any specific number of point-in-time consistent data sets or corresponding data structures.

Any point-in-time consistent data set created as described above is empty upon creation. Multiple sets can be created in a similar manner. For example, it may be useful in certain implementations to create and maintain a persistent data set at the beginning of each hour throughout a business day. In a different implementation, it may be useful to create and maintain multiple persistent data sets beginning at the same time each day, but persisting for a different duration. For example, at the beginning of the day, a one hour set, a two hour set, a three hour set and so on may be created. In any event, each set is empty upon creation. The description below contemplates the use of two point-in-time consistent data sets. This convention of describing a simplified two set system is employed throughout FIG. 3 and FIG. 4. However, it should be noted that Applicant's invention will typically involve the creation of more than two point-in-time consistent data sets, and is not limited to any specific number of consistent data sets.

Figure 3:
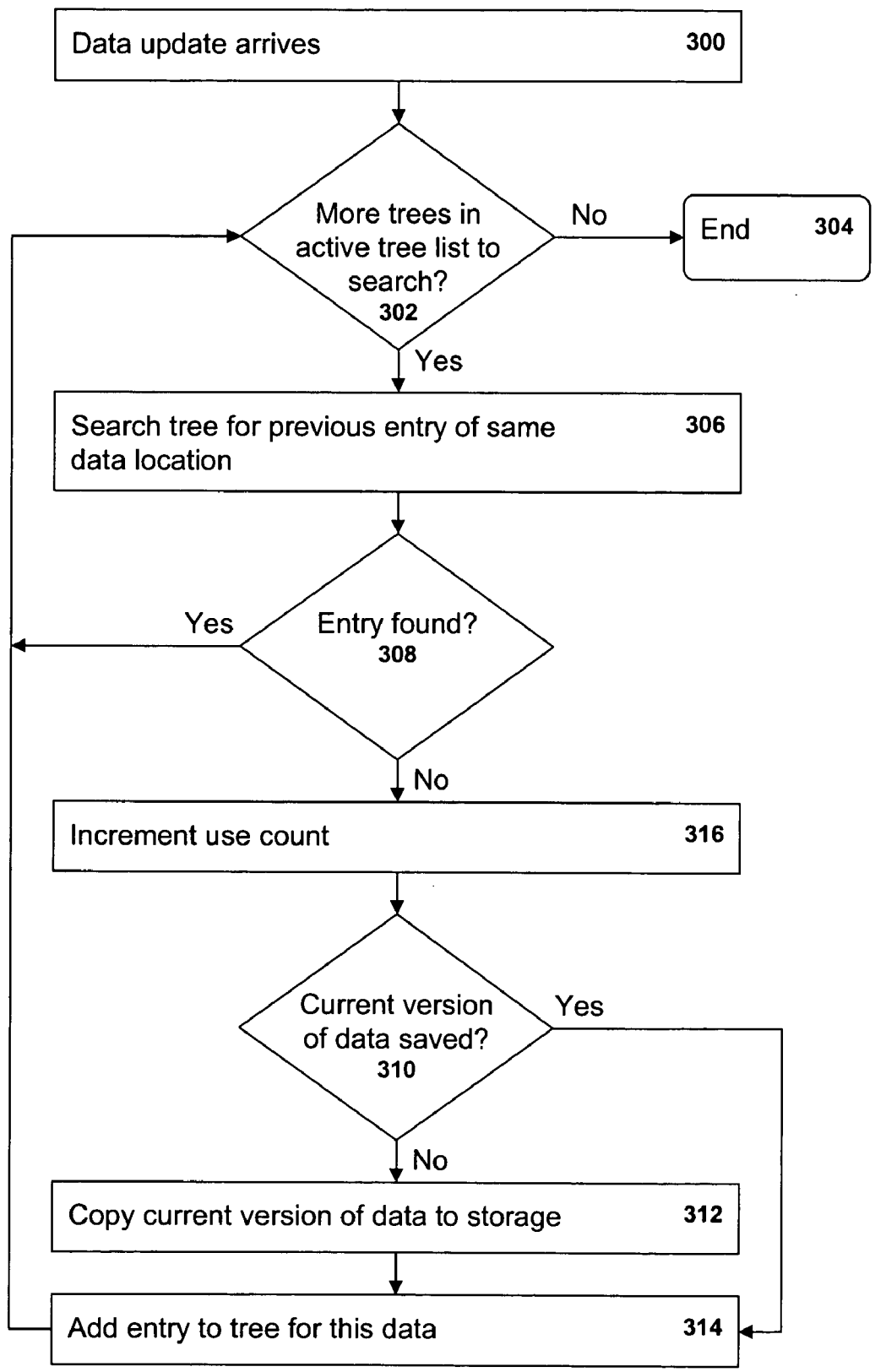
FIG. 3 is a data flow diagram illustrating one manner of processing a point-in-time consistent data set upon receipt of a data update.

In one embodiment of the invention, as shown on FIG. 3, the multiple point-in-time consistent data sets begin to be populated with the data necessary to revert the secondary controller 116 to a select point in time upon receipt of a first data update from the primary controller 102. As a data update arrives (step 300) at the backup appliance 106, each data update is checked to see if the data has already changed since the formation of any particular data set. If the data which is the subject of the update has not changed since the creation of a particular data set, the current version of the data is read from storage 122 and written to a storage volume 112 that contains the applicable data set. Only after the current version of data is read from storage and written to the applicable point-in-time consistent data set(s) is the update applied to the storage 122 associated with the secondary controller 116.

FIG. 3 shows representative data structure processing steps which may be used to implement the determination of whether data has changed since the formation of a particular point-in-time consistent data set. The backup appliance 106 first executes commands to determine whether all trees in the active tree list have been searched with respect to the data update (step 302). If all trees in the active tree list have been searched, the process ends (step 304). Prior to ending the search, each tree is searched for entries with respect to the same data location (step 306). As noted above, each point-in-time consistent data set formed will have a separate tree in the active tree list (step 204). If an entry is found corresponding to the same data location, indicating that the data has been previously updated since the formation of a particular point-in-time consistent data set, no data is added to the subject data set and the next tree in the active tree list is examined (step 308). If no entry is found for the subject location, a determination is made whether the current version of data has already been saved (step 310) with respect to the point-in-time consistent data set under examination. If the current version has not been saved, it will be copied to the data set (step 312). In addition, an entry is added to the appropriate trees of each affected data structure 118, 120. As discussed in more detail below, the entry may be an indication that a copy of data has been saved to the respective point-in-time consistent data set (step 314), or the entry may be a pointer to data stored with respect to another set. In addition, If the entry is added to more than one data structure 118, 120, then the use count will be updated to match the number of data structures for which this data update is valid (step 316). The incremental use count can be employed to determine the relative persistence among various separate point-in-time consistent data sets.

As noted above in step 308, if another update for the same data block subsequently arrives, no changes will be made to the data set. This process repeats with each incoming data update being checked to see if it has been changed for all appropriate sets.

It is desirable to optimize the amount of data that is stored in each set by recognizing that some sets will contain identical portions of data. A simplified system featuring two point-in-time consistent data sets, one formed at the beginning of a work day (8:00 A.M.) and a second formed at 9:00 A.M. may be used to discuss this aspect of the invention. A data update arriving at the backup appliance 106 at 8:30 A.M. will cause a copy of the current version of the data to be stored in association with the 8:00 A.M. data set (step 312). However, the 9:00 A.M. data set does not exist at this point in time, and is, therefore, unaffected. Similarly, an update to the same data location received at 9:30 A.M. will cause the version of the data as it exists at 9:30 A.M. to be stored in association with the 9:00 A.M. data set (step 312). However, no change will be made to the 8:00 A.M. data set since a previous entry for the same data location exists (step 306). Finally, a data update for a previously unchanged location may be received at 10:00 A.M. The 10:00 A.M. update will cause a current version of the data as of 10:00 A.M. to be read from storage 122 and written to both point-in-time consistent data sets (step 312). Preferably, data usage is optimized by writing only one copy of the 10:00 A.M. data to one of the sets and saving a pointer to that copy of the data in any other set that may need the same data. The use of a pointer in association with a binary tree or hash table is one method of linking the data saved in association with one set to another set which may need the same data. Other data structures and data searching techniques can be used to implement this storage optimization technique.

In an alternative embodiment, the current version of the data read from storage 122 can be saved in memory independent of the first data set, the second data set or any other point in time consistent data sets. In such an embodiment, pointers can be saved in each affected data set directed to the saved copy of the current version of the data.

As noted above, it is possible in one embodiment of the invention that the multiple point-in-time consistent data sets are not created at different times, but are designed to have different durations. For example, a user may decide that it is advantageous to create four data sets at 8:00 A.M., with the first data set having a two hour persistence, the second a four hour persistence, the third a six hour persistence, and the fourth an eight hour persistence. In such an embodiment, the current version of data which is the subject of an update can be saved in association with one of the sets or in memory independent of any of the sets. Pointers can be placed in each of the remaining sets to the current version of the data.

Preferably, the system is configured to select the data set with the longest persistence to save the actual data and place pointers to this data in the less persistent sets. For example, a beginning of the day data set specifically maintained for one day will be the most persistent when followed by hourly data sets throughout the day. However, a close of business data set which persists to the next business day may be more persistent than a beginning of the day set if the user elects to cycle data sets on a daily basis.

As discussed above, a user may revert the storage 122 to a state that existed at the point-in-time any data set was formed. Reversion occurs when the user selects a desired data set to apply. To apply the set, preferably the system will execute commands to first read the current versions of data on the backup storage, represented in FIG. 1 as secondary storage 122, for every block that is contained or pointed to in the selected data set. Preferably, as the data is read it is written to a side file so that the system may revert back to the current state in the future if desired. After saving all data that will be overwritten, the data from the selected point-in-time consistent data set is written to the storage. This operation will revert the storage back to a state at the beginning of the applied set.

The user of a storage system can select the duration of the persistence of a particular point-in-time consistent data set. Typically, sets will persist until expressly deleted. As shown on FIG. 4, deletion of a set commences by a command from the user to delete a set, or a pre-scheduled, automatic deletion at a specific time (step 400). The algorithm loops through the illustrated steps: 402, finding a next node, 404, decrementing the use count, 406, determining if use count is 0, 408, freeing memory storing data, and 410, freeing the appropriate node until there are no more tree nodes remaining in the tree (step 412). Thus, for each remaining tree node, the algorithm decrements the use count for the data entry associated with the node (step 404). If the use count is zero (step 406), the data associated with this entry will be freed (step 408). The tree node is then freed as well (step 410). When all tree nodes have been freed, the tree header is removed from the active tree list and the memory associated with it is freed, (step 414 and the deletion process ends (step 416).

Figure 2:
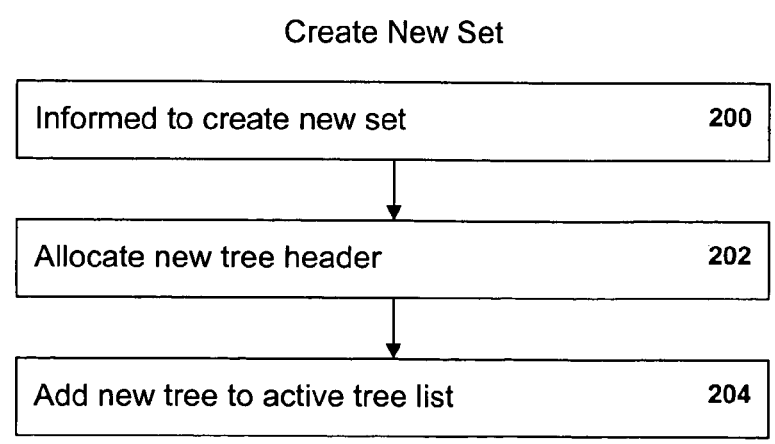
FIG. 2 is a data flow diagram illustrating one manner in which a new point-in-time consistent data set may be created.
Figure 4:
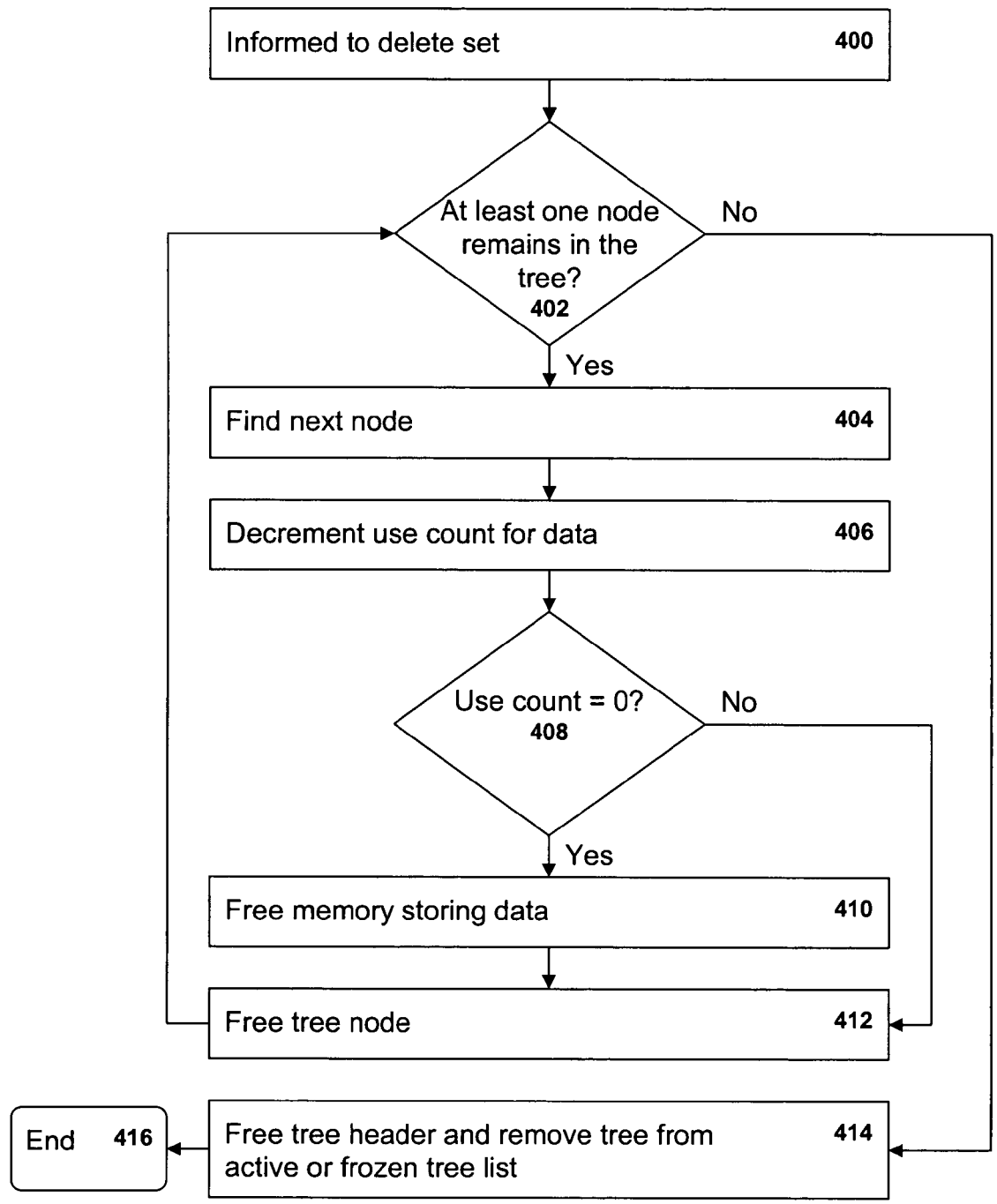
FIG. 4 is a data flow diagram illustrating one manner of deleting a point-in-time consistent data set.

The illustrated logic of FIGS. 2–4 show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The described techniques for storing and retrieving multiple point-in-time consistent data sets may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., magnetic storage medium such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media such as network transmission line, wireless transmission media, signals propagating through space, radio waves, infrared signals, etc. Of course, those skilled in the art will recognize that many modifications may be made to this configuration without departing from the scope of the implementations and that the article of manufacture may comprise any information bearing medium known in the art.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method of processing multiple point-in-time consistent data sets comprising:

creating a first data set;

creating a second data set wherein the first data set and the second data set are associated with a backup appliance which is associated with backup storage;

transferring a first update from a primary storage controller to the backup appliance;

determining that the first update affects first data stored in the backup storage that has been unchanged following the creation of the first data set and the second data set;

reading the first data from the backup storage;

writing a copy of the first data to the first data set;

saving a pointer associated with the second data set and directed to the copy of the first data; and applying the update to the first data on the backup storage.

2. The method of claim 1 further comprising:

transferring a second update from the primary storage controller to the backup appliance;

determining that the second update affects second data stored in the backup storage that has been changed following the creation of the first data set and unchanged following the creation of the second data set;

reading the second data from the backup storage;

writing the second data to the second data set; and applying the update to the second data on the backup storage.

3. The method of claim 2 further comprising:

transferring a third update from the primary storage controller to the backup appliance;

determining that the third update affects third data that has been changed following the creation of the first data set and changed following the creation of the second data set; and applying the update to the third data on the backup storage.

4. The method of claim 1 further comprising reverting the backup storage to a state that existed at the time the first data set was created.

5. The method of claim 4 wherein reverting the backup storage to a state that existed at the time the first data set was created comprises:

reading the current version of the data stored on the backup storage for every data block that has been written to the first data set; and overwriting the data stored on the backup storage with the data previously written to the first data set.

6. The method of claim 5 further comprising writing the data read from the backup storage in the reading step to a side file prior to overwriting the data.

7. The method of claim 1 further comprising:

determining which of the first and the second data sets has the longest persistence; and writing the copy of the first data to the data set with the longest persistence.

8. The method of claim 7 further comprising associating a pointer to the copy of the first data with the data set that does not have the longest persistence.

9. The method of claim 8 wherein the step of creating a first data set comprises:

informing the backup appliance to create a new data set;

allocating a new tree header associated with the new data set; and adding a new tree to an active tree list maintained in association with the backup appliance.

10. The method of claim 9 wherein the step of determining that the first update affects first data that has been unchanged following the creation of the first data set and the second data set comprises searching each tree maintained in the active tree list for a previous entry for the same data location.

11. The method of claim 1 further comprising incrementing a use count associated with the first data in association with determining that the first update affects data included in multiple data sets.

12. A method of processing multiple point-in-time consistent data sets comprising:

creating a first data set;

creating a second data set wherein the first data set and the second data set are associated with a backup appliance having memory and which is associated with backup storage;

transferring a first update from a primary storage controller to the backup appliance;

determining that the first update affects first data stored in the backup storage that has been unchanged since following the creation of the first data set and the second data set;

reading the first data from the backup storage;

storing a copy of the first data to a memory location independent of the first and second data sets;

saving a pointer associated with each of the first data set and the second data set and directed to the copy of the first data; and applying the update to the first data on the backup storage.

13. The method of claim 12 further comprising:

transferring a second update from the primary storage controller to the backup appliance;

determining that the second update affects second data stored in the backup storage that has been changed following the creation of the first data set and unchanged following the creation of the second data set;

reading the second data from the backup storage;

storing a copy of the second data to the memory location independent of the first and second data sets;

saving a pointer associated with the second data set and directed to the copy of the second data; and applying the update to the second data on the backup storage.

14. The method of claim 13 further comprising:

transferring a third update from the primary storage controller to the backup appliance;

determining that the third update affects third data that has been changed following the creation of the first data set and changed following the creation of the second data set; and applying the update to the third data on the backup storage.

15. A backup appliance associated with backup storage, the backup appliance having the capability to receive data updates from a primary storage controller and the backup appliance comprising:

means for creating a first data set;

means for creating a second data set;

means for determining whether a data update affects data that has been unchanged following the creation of the first data set and the second data set;

means for reading the first data from the backup storage;

means for writing a copy of the first data to a storage location associated with one of the first data set, the second data set and a memory location independent of the first and second data sets;

means for saving a pointer associated with one of the first data set and the second data set and directed to the copy of the first data; and means for applying the update to the first data on the backup storage.

16. The backup appliance of claim 15 further comprising means for reverting the backup storage to a state that existed at the time the first data set was created.

17. The backup appliance of claim 16 further comprising:

means for reading the current version of the data stored on the backup storage for every data block that has been written to the storage location;

means for writing the data read from the backup storage to a side file; and means for overwriting the data stored on the backup storage with the data previously written to the storage location.

18. The backup appliance of claim 15 further comprising means for determining which of the first and the second data sets has the longest persistence.

19. An article of manufacture comprising a computer readable medium for use in programming a backup device to process multiple point-in-time consistent data sets, the article of manufacture comprising instructions for:

creating a first data set;

creating a second data set wherein the first data set and the second data set are associated with a backup appliance which is associated with backup storage;

transferring a first update from a primary storage controller to the backup appliance;
determining that the first update affects first data stored in the backup storage that has been unchanged following the creation of the first data set and the second data set;
reading the first data from the backup storage;
writing a copy of the first data to the first data set;
saving a pointer associated with the second data set and directed to the copy of the first data; and
applying the update to the first data on the backup storage.

20. The article of manufacture of claim 19 further comprising instructions for:
transferring a second update from the primary storage controller to the backup appliance;
determining that the second update affects second data stored in the backup storage that has been changed following the creation of the first data set and unchanged following the creation of the second data set;
reading the second data from the backup storage;
writing the second data to the second data set; and
applying the update to the second data on the backup storage.

21. The article of manufacture of claim 20 further comprising instructions for:
transferring a third update from the primary storage controller to the backup appliance;
determining that the third update affects third data that has been changed following the creation of the first data set and changed following the creation of the second data set; and
applying the update to the third data on the backup storage.

22. The article of manufacture of claim 19 further comprising instructions for reverting the backup storage to a state that existed at the time the first data set was created.

23. The article of manufacture of claim 22 further comprising instructions for:
reading the current version of the data stored on the backup storage for every data block that has been written to the first data set;
writing the data read from the backup storage in the previous step to a side file; and
overwriting the data stored on the backup storage with the data previously written to the first data set.

24. The article of manufacture of claim 19 further comprising instructions for:
determining which of the first and the second data sets has the longest persistence; and
writing the copy of the first data to the data set with the longest persistence.

25. The article of manufacture of claim 24 further comprising instructions for associating a pointer to the copy of the first data with the data set that does not have the longest persistence.

26. The article of manufacture of claim 19 wherein the instructions for determining that the first update affects first data that has been unchanged following the creation of the first data set and the second data set further comprises instructions for searching each tree maintained in an active tree list for a previous entry for the same data location.

27. The article of manufacture of claim 19 further comprising instructions for:
incrementing a use count associated with the first data set in association with determining that the first update affects data that is included in multiple data sets.

28. An article of manufacture comprising a computer readable medium for use in programming a backup device to process multiple point-in-time consistent data sets, the article of manufacture comprising instructions for:
creating a first data set;
creating a second data set wherein the first data set and the second data set are associated with a backup appliance having memory and which is associated with backup storage;
transferring a first update from a primary storage controller to the backup appliance;
determining that the first update affects first data stored in the backup storage that has been unchanged since following the creation of the first data set and the second data set;
reading the first data from the backup storage;
storing a copy of the first data to a memory location independent of the first and second data sets;
saving a pointer associated with each of the first data set and the second data set and directed to the copy of the first data; and
applying the update to the first data on the backup storage.

29. The article of manufacture of claim 28 further comprising instructions for:
transferring a second update from the primary storage controller to the backup appliance;
determining that the second update affects second data stored in the backup storage that has been changed following the creation of the first data set and unchanged following the creation of the second data set;
reading the second data from the backup storage;
storing a copy of the second data to the memory location independent of the first and second data sets;
saving a pointer associated with the second data set and directed to the copy of the second data; and
applying the update to the second data on the backup storage.

30. The article of manufacture of claim 29 further comprising instructions for:
transferring a third update from the primary storage controller to the backup appliance;
determining that the third update affects third data that has been changed following the creation of the first data set and changed following the creation of the second data set; and
applying the update to the third data on the backup storage.

* * * * *